(12) United States Patent
Partis (10) Patent No.: US 8,316,431 B2
(45) Date of Patent: Nov. 20, 2012

(54) CONCURRENT IPSEC PROCESSING SYSTEM AND METHOD

(75) Inventor: Ashley Partis, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 11/573,260

(22) PCT Filed: Oct. 12, 2005

(86) PCT No.: PCT/AU2005/001584
§ 371 (c)(1),
(2), (4) Date: Feb. 5, 2007

(87) PCT Pub. No.: WO2006/079139
PCT Pub. Date: Aug. 3, 2006

(65) Prior Publication Data
US 2007/0214358 A1    Sep. 13, 2007

(30) Foreign Application Priority Data

Oct. 12, 2004  (AU) ................................ 2004905889

(51) Int. Cl.
*H04L 29/00* (2006.01)
(52) U.S. Cl. .............................. 726/13; 726/14; 713/161
(58) Field of Classification Search ............... 726/13, 726/14; 713/161; 370/389
See application file for complete search history.

(56) References Cited

U.S. PATENT DOCUMENTS

| 6,160,809 | A | 12/2000 | Adiletta |
| 6,477,646 | B1 | 11/2002 | Krishna |
| 6,542,508 | B1 | 4/2003 | Lin |
| 6,708,218 | B1 * | 3/2004 | Ellington et al. ............. 709/236 |
| 6,847,645 | B1 * | 1/2005 | Potter et al. .................... 370/392 |
| 6,901,496 | B1 * | 5/2005 | Mukund et al. ............... 711/169 |
| 6,996,651 | B2 * | 2/2006 | Garinger et al. .............. 710/305 |
| 7,003,118 | B1 * | 2/2006 | Yang et al. .................... 380/287 |
| 7,194,766 | B2 * | 3/2007 | Noehring et al. ............... 726/13 |
| 7,305,492 | B2 * | 12/2007 | Bryers et al. .................. 709/249 |
| 7,434,045 | B1 * | 10/2008 | Enderwick et al. ........... 713/158 |
| 7,843,951 | B2 * | 11/2010 | Spencer ........................ 370/412 |
| 2002/0027928 | A1 | 3/2002 | Fang |
| 2003/0135678 | A1 | 7/2003 | Andre |
| 2003/0196081 | A1 * | 10/2003 | Savarda et al. ................ 713/153 |
| 2004/0037320 | A1 * | 2/2004 | Dickson ........................ 370/473 |
| 2004/0123123 | A1 * | 6/2004 | Buer et al. .................... 713/189 |
| 2004/0141524 | A1 | 7/2004 | Lee |
| 2004/0205332 | A1 | 10/2004 | Bouchard et al. |
| 2004/0205336 | A1 | 10/2004 | Kessler et al. |
| 2005/0008011 | A1 * | 1/2005 | Georgiou et al. ............. 370/389 |
| 2005/0102525 | A1 | 5/2005 | Akimoto |
| 2005/0286517 | A1 * | 12/2005 | Babbar et al. ................. 370/389 |
| 2006/0059316 | A1 * | 3/2006 | Asher et al. ................... 711/141 |
| 2006/0064510 | A1 | 3/2006 | Low |
| 2007/0086447 | A1 | 4/2007 | Parameseswaran et al. |

* cited by examiner

*Primary Examiner* — Catherine Thiaw
(74) *Attorney, Agent, or Firm* — Fitzpatrick, Cella, Harper & Scinto (57) ABSTRACT

A method of performing IPsec processing of an incoming communication packet is disclosed. The method comprises determining, from a received portion of the incoming packet, if sufficient information has been received to enable the IPsec processing to be commenced, obtaining the necessary information from the received portion of the packet, and commencing IPsec processing of said packet before the entire packet has been received depending upon the obtained information.

10 Claims, 10 Drawing Sheets

CONCURRENT IPSEC PROCESSING SYSTEM AND METHOD

This application is a national stage application under 35 U.S.C. 371 of international application no. PCT/AU2005/001584, filed on Oct. 12, 2005, the contents of which are hereby incorporated by reference as set forth in full herein.

FIELD OF THE INVENTION

The current invention relates to cryptographic processing and in particular to methods of increasing the speed of processing IPsec cryptographic packets (RFC2401).

BACKGROUND OF THE INVENTION

As the Internet has grown, privacy has progressively become a more significant issue, with sensitive information increasingly being communicated over insecure data networks. There are many different applications requiring privacy and security over the Internet, such as banking, commercial transactions or accessing private company networks remotely. These transactions often involve sending sensitive information over insecure sections of the Internet, requiring such sensitive information to be secured.

The present data communication protocol that is generally used to communicate over the Internet, namely Internet Protocol (IP), is not secure. Consequently, third parties can potentially eavesdrop on transmitted packets, repeat transmitted packets or even divert packets off the network and replace the diverted packets with locally created or forged packets.

In order to protect against this, a method of securing Internet communication packets has been created, and called IP Security, or "IPsec". IPsec is a complex approach that provides security services for IP packets, thereby providing confidentiality, authentication and protection against "replayed" packets. IPsec is controlled by a set of rules (also known as "Security Policies") that are created prior to processing network traffic.

Several protocols are used in IPsec, each protocol having headers that must be processed separately to the base IP header. Each IPsec protocol offers a set of services. Examples of IPsec protocols include the Encapsulating Protocol (ESP), the Authentication Header (AH), IP Compression (IPcomp) and Internet Key Exchange (IKE).

Each IPsec protocol uses one or more cryptographic algorithms to provide the services offered by the protocol. Due to the speed bottleneck presented by the cryptographic algorithms, it is difficult to process IPsec packets at faster than network (line) speeds without parallelism and pipelining. These approaches include processing multiple IPsec packets at one point in time, which is difficult to do at high speeds.

A further problem is the unpredictable amount of latency generated from a Security Association Database (SAD) lookup. This latency can be extremely small or large, depending on the type of lookup and the number of Security Associations (SA's) involved.

SUMMARY OF THE INVENTION

It is an object of the present invention to substantially overcome, or at least ameliorate, one or more disadvantages of existing arrangements.

Disclosed are arrangements, referred to in this specification as "partial packet IPsec processing" arrangements, which seek to address the above problems by starting to IPsec process a packet as soon as sufficient "selectors" have been received, without waiting for the entire packet to be received. The disclosed partial packet IPsec processing arrangements are applicable both to packets being IPsec processed for transmission, these packets being referred to as "packets for transmission", and to IPsec processing of received packets, these packets being referred to as "received packets". The term "incoming packet" refers to a packet that is input into a disclosed partial packet IPsec processing arrangement, and can be either a packet for transmission, or a received packet.

The term "selector" is described in relation to FIGS. 3A-3D and FIG. 4. Prior art solutions require the entire packet to be written to memory before the selectors can be found in the packet and/or before processing can begin. This aggravates the latency of the processing due to the need to wait for the packet to be completely received before processing of the packet can start. This latency can be unpredictable and large, as packets can range from 20 bytes to 64 k bytes, although most packets range from 64 bytes to 8 k bytes in size. The disclosed partial packet IPsec processing approach reduces the aforementioned latency by starting the processing cycle as soon as enough information is present.

According to a first aspect of the present invention, there is provided a method of performing IPsec processing of an incoming communication packet, the method comprising the steps of:

determining, from a received portion of the packet, if sufficient information has been received to enable said IPsec processing to be commenced;

obtaining said sufficient information from the received portion of the packet; and commencing IPsec processing of said packet before the entire packet has been received depending upon the obtained information.

According to another aspect of the present invention, there is provided an apparatus for performing IPsec processing of an incoming communication packet, the apparatus comprising:

means for determining, from a received portion of the packet, if sufficient information has been received to enable said IPsec processing to be commenced;

means for obtaining said information from the received portion of the packet; and means for IPsec processing said packet before the entire packet has been received depending upon the obtained information.

According to another aspect of the present invention, there is provided an apparatus for performing IPsec processing of an incoming communication packet, the apparatus comprising:

a processor; and a program for directing the processor to perform the steps of:

determining, from a received portion of the packet, if sufficient information has been received to enable said IPsec processing to be commenced;

obtaining said information from the received portion of the packet; and     commencing IPsec processing of said packet before the entire packet has been received depending upon the obtained information.

According to another aspect of the present invention, there is provided a computer program product including a computer readable medium having recorded thereon a computer program for directing a processor to execute a method of performing IPsec processing of an incoming communication packet, the program comprising:

code for determining, from a received portion of the packet, if sufficient information has been received to enable said IPsec processing to be commenced;

code for obtaining said information from the received portion of the packet; and code for IPsec processing said packet before the entire packet has been received depending upon the obtained information.

According to another aspect of the present invention, there is provided a computer program for directing a processor to execute a method of performing IPsec processing of an incoming communication packet, the program comprising:

code for determining, from a received portion of the packet, if sufficient information has been received to enable said IPsec processing to be commenced;

code for obtaining said information from the received portion of the packet; and code for IPsec processing said packet before the entire packet has been received depending upon the obtained information.

According to another aspect of the present invention, there is provided a communication packet formed by a method of performing IPsec processing of an incoming communication packet, the method comprising the steps of:

determining, from a received portion of the packet, if sufficient information has been received to enable said IPsec processing to be commenced;

obtaining said information from the received portion of the packet; and commencing IPsec processing said packet before the entire packet has been received depending upon the obtained information.

Other aspects of the invention are also disclosed.

BRIEF DESCRIPTION OF THE DRAWINGS

One or more embodiments of the present invention will now be described with reference to the drawings, in which.

DETAILED DESCRIPTION OF THE PREFERRED EMBODIMENTS

It is to be noted that the discussions contained in the "Background" section and that above relating to prior art arrangements relate to discussions of devices which form public knowledge through their use. Such should not be interpreted as a representation by the present inventor or patent applicant (s) that such documents or devices in any way form part of the common general knowledge in the art.

Some portions of the description which follows are explicitly or implicitly presented in terms of algorithms and symbolic representations of operations on data which is either (a) within a computer memory and/or (b) within storage elements in a hardware or mixed hardware/software platform. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "obtaining", "commencing", "extracting", "processing", "repeating", "configuring", "identifying", "scanning", "calculating", "determining", "replacing", "generating" "initializing", "outputting", or the like, refer to the action and processes of a computer system, or similar or computationally equivalent electronic device, that manipulates and transforms data represented as physical (electronic) quantities within the registers and memories of the computer system into other data similarly represented as physical quantities within the computer system memories or registers or other such information storage, transmission or display devices.

The present specification discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general and/or special purpose machines may be used with programs in accordance with the teachings herein. Alternatively, the construction of more specialized apparatus to perform the required method steps may be appropriate. The structure of a conventional general purpose computer, and of a special purpose computation device, will appear from the description below.

In addition, the present invention also implicitly discloses a computer program, in that it would be apparent to the person skilled in the art that the individual steps of the preferred method described herein can be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Where reference is made in any one or more of the accompanying drawings to steps and/or features, which have the same reference numerals, those steps and/or features have for the purposes of this description the same function(s) or operation(s), unless the contrary intention appears.

Figure 1A:
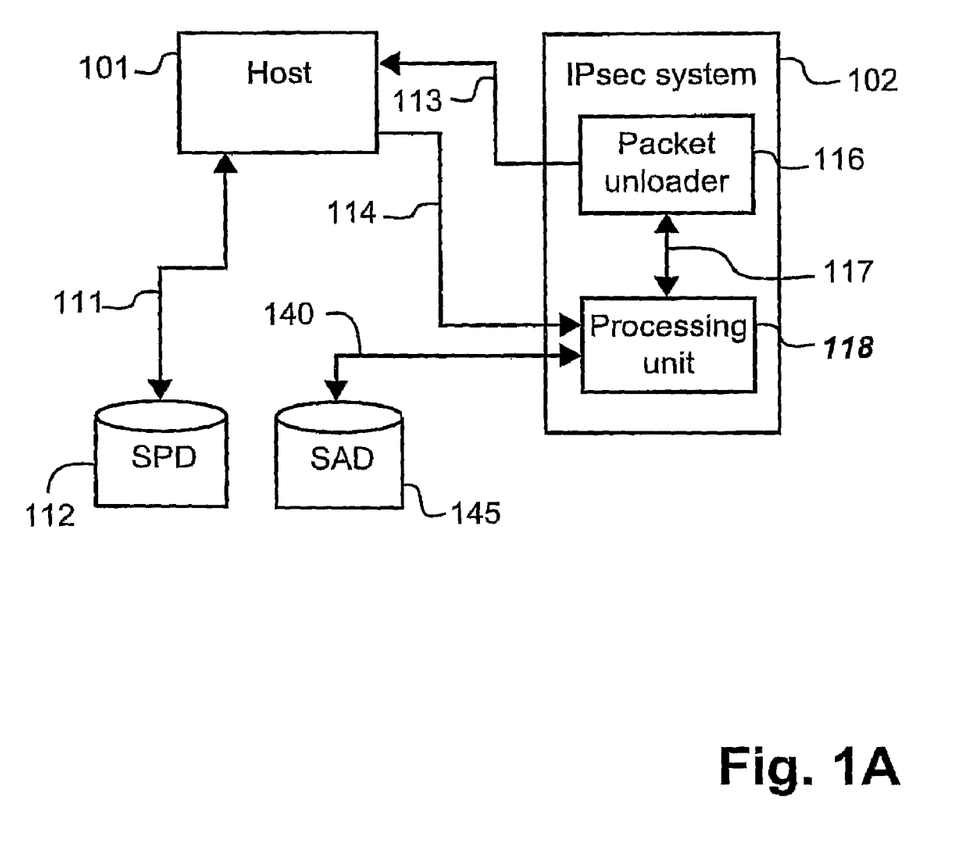
FIG. 1A is a functional block diagram of an architecture for performing the disclosed partial packet IPsec processing method.

FIG. 1A shows one example of an architecture for performing IPsec processing upon a given packet. A host 101 communicates with an IPsec system 102 via a pair of connections 113 and 114. The IPsec system 102 comprises a packet unloader 116 and a processing unit 118 that communicate via a connection 117. The processing unit 118 communicates with a Security Association Database (SAD) 145 via a connection 140. The host 101 communicates with a Security Policy Database (SPD) 112 via a connection 111.

All packets that are to be processed by the IPsec system 102 are first examined in order to determine which packets require IPsec processing. This determination is performed by either performing a Security Policy Database (SPD) lookup (in the case of a packet for transmission) based upon selectors that are present in the packet, or determining the presence of an IPsec header (in the case of a received packet).

Incoming packets received via an external network 620 (see FIG. 6), (ie received packets), are received by the host 101 which forwards the received packets at high speed to the IPsec processing system 102. The IPsec system 102 processes these packets, at line speed or greater, and sends the processed (received) packets back to the host 101.

Packets for transmission, generated by the host 101 for transmission over the network 620, are forwarded by the host 101 at high speed to the IPsec processing system 102. The system 102 IPsec processes these packets (for transmission), at line speed or greater, and sends the processed packets to the host 101 for forwarding over the network.

Figure 1B:
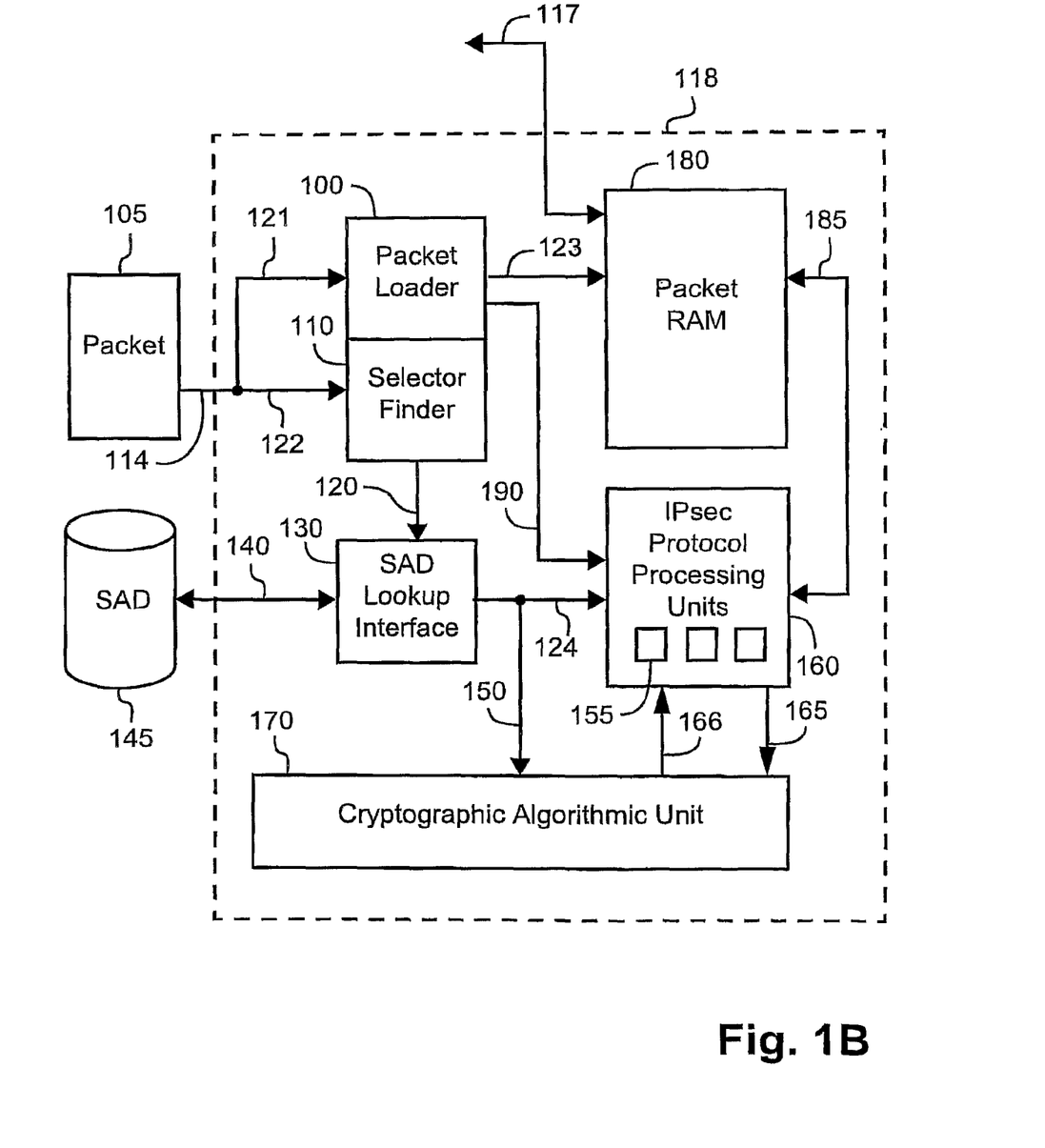
FIG. 1B shows a functional block diagram of the IPsec processing unit of FIG. 1A.

FIG. 1B shows a functional block diagram of the IPsec system processing unit 118. An incoming packet 105 is directed to a Packet Loader 100 and a Selector Finder 110 by respective connections 121 and 122. The Packet Loader 100 is connected to a Packet RAM 180 by a connection 123, and to an IPsec processing unit module 160 by a connection 190. The Selector Finder 110 is connected to a SAD lookup interface 130 by a connection 120. The SAD lookup interface 130 is connected to the SAD 145 (see FIG. 1A) by the connection 140. The SAD lookup interface is connected to the IPsec protocol processing unit module 160 by a connection 124 and to a cryptographic algorithmic unit 170 by a connection 150. The cryptographic algorithmic unit 170 is described in more detail in regard to FIG. 7. The IPsec protocol processing unit module 160 is connected to the cryptographic algorithmic unit 170 by connections 165 and 166, and to the packet RAM 180 by a connection 185. The packet RAM 180 is connected to the Packet Unloader (see FIG. 1A) by the connection 117. The IPsec system processing unit 118 can in practice be implemented as an ASIC accelerator chip.

Figure 2A:
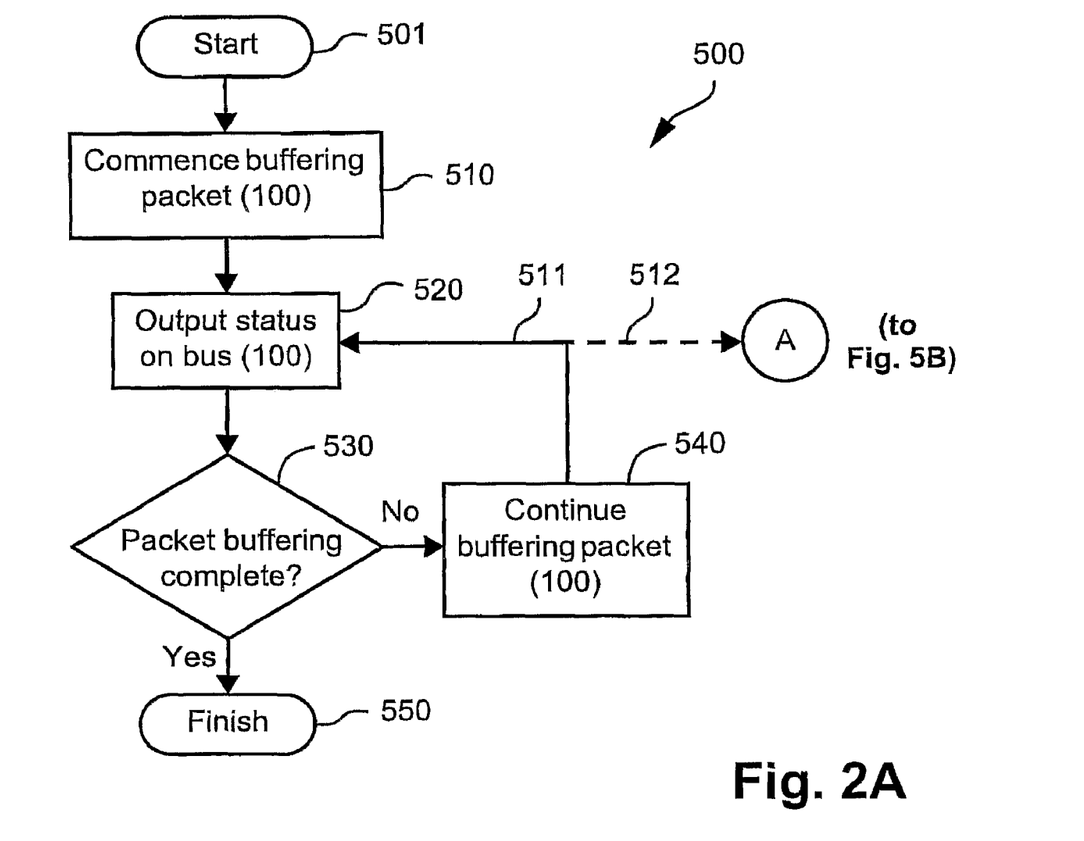
FIGS. 2A-2B depict flow charts of concurrent process fragments for one example of a method for implementing the disclosed partial packet IPsec processing approach.
Figure 2B:
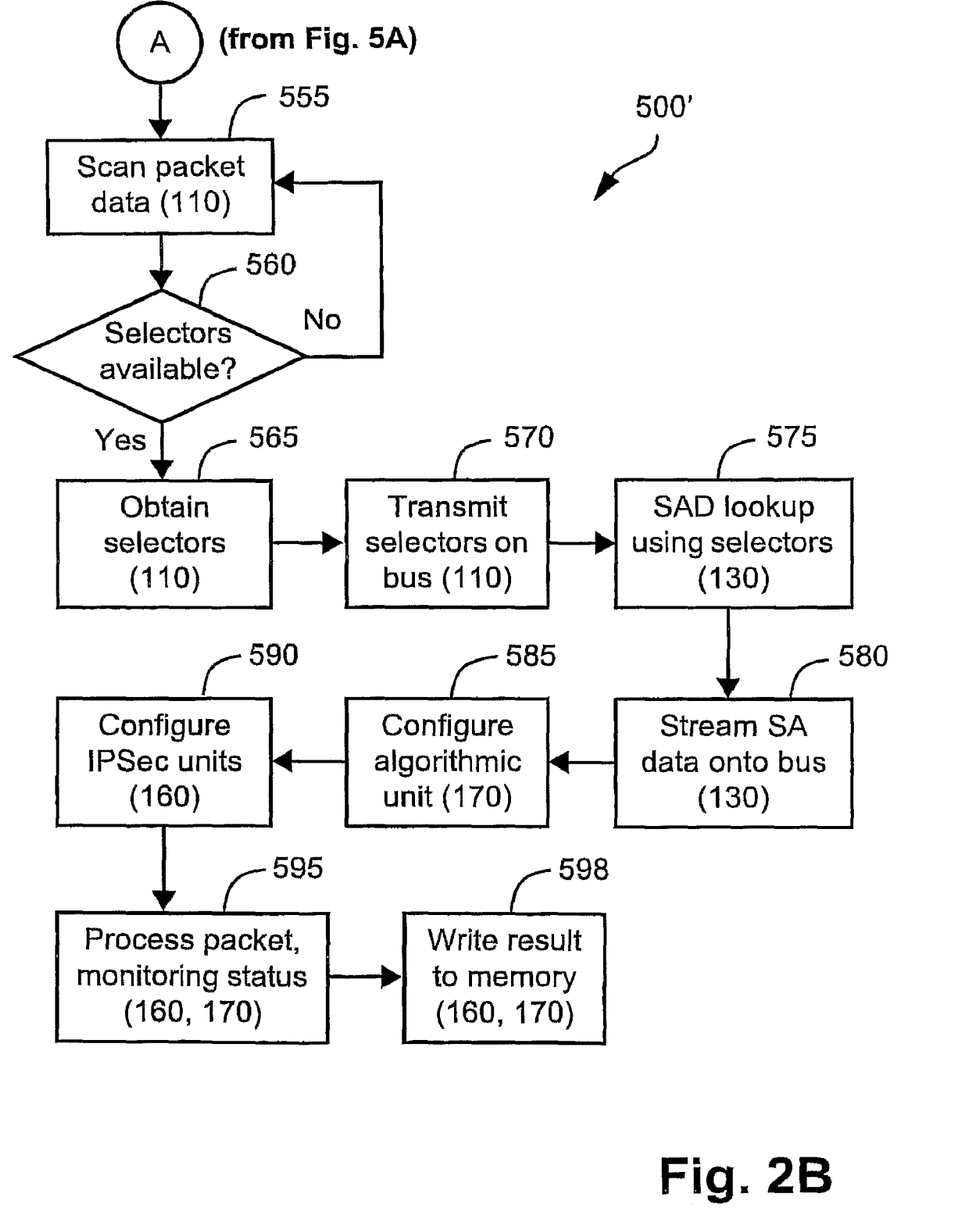

FIGS. 2A-2B depict concurrent process fragments 500 and 500' for performing the partial packet IPsec processing approach. The method 500 is carried out by various elements of the IPsec system 102 (see FIGS. 1A and 1B).

FIG. 2A shows the process fragment 500 which starts with a START step 501, after which incoming packets (e.g. 105) that arrive into the system 102 are loaded into the local packet RAM 180 (see FIG. 1B) via the Packet Loader 100 in a step 510. The Packet Loader 100 receives all incoming data and buffers, in a small buffer in the Packet Loader 100, the data to be written to memory 180 as the incoming packet (e.g. 105) is streamed into the system. The incoming packet is written to memory as fast as it arrives at the Packet Loader 100.

The Packet Loader 100 also outputs the status of the incoming packet onto a bus 190 in a step 520. This status includes the current write pointer of the incoming packet in memory and an indication of whether the whole incoming packet has currently arrived. The incoming packet 105 can arrive at the Packet Loader 100 from the host 101 in segments, resulting in delays before the whole packet has arrived. The packet status on the bus 190 is also available, as depicted by a dashed arrow 512 and a circled letter "A" to the concurrent process fragment 500' in FIG. 2B.

FIGS. 3A-3D depict the layout of an IP header 300, an Authentication Header 350, an Encapsulating Security Protocol header 360 and the layout of a typical IP packet without IPsec headers 370, respectively. In an IPsec context, a Security Association Database (SAD) contains Security Associations (SAs). Each SA contains the information required to process an IPsec packet. The SAD must be looked up to locate an SA for each IPsec packet that is required to be processed. The selectors used to lookup a Security Association from the Security Association Database are obtained from the aforementioned headers.

Figure 4:
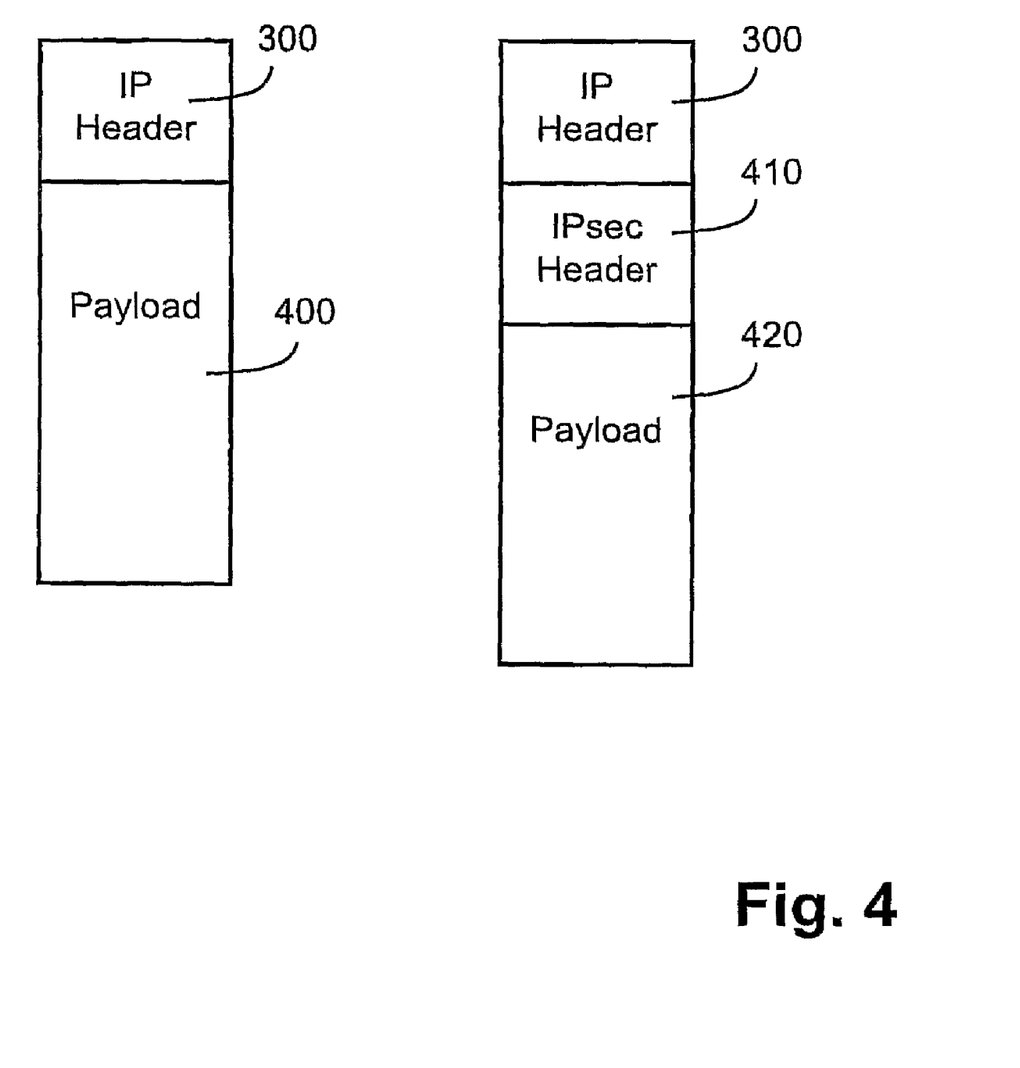
FIG. 4 shows the typical layout of the packets processed by the partial packet IPsec processing method.

FIG. 4 shows the IP header 300, the IPsec header 410 (either the Authentication Header 350 or the Encapsulating Security Protocol header 360) and the IP packet payloads 400 and 420 in the context of a complete IP packet with and without IPsec.

Figure 3A:
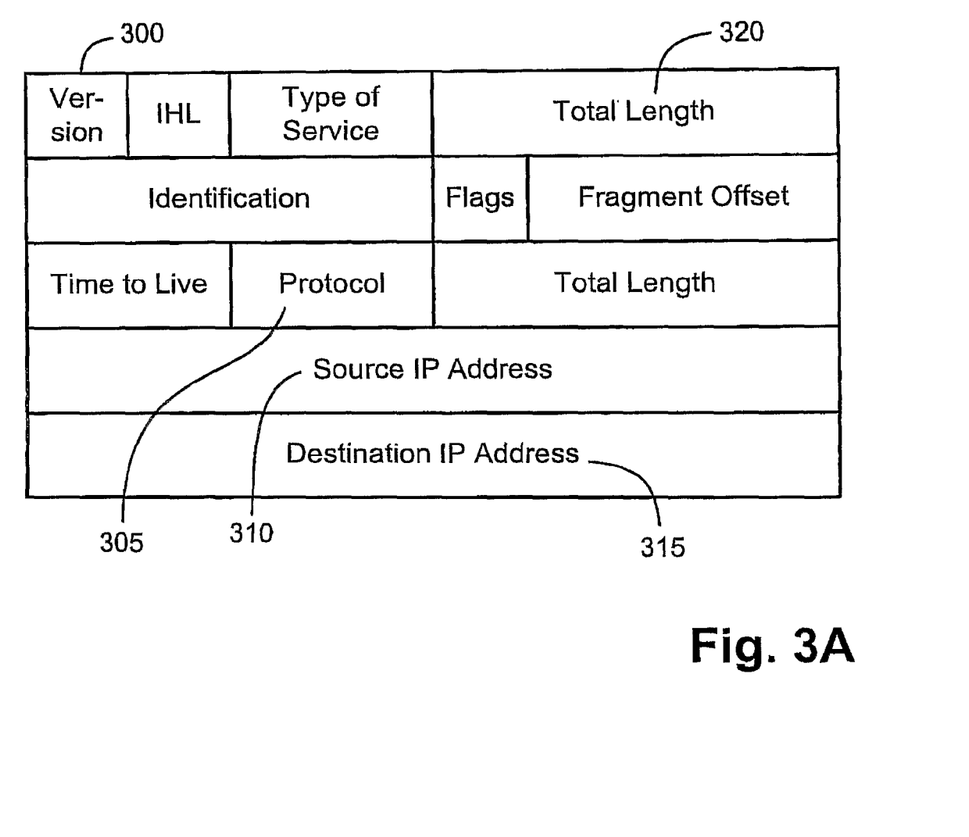
FIGS. 3A-3D show the typical layout of an IPv4 header, IPsec headers and an IPv4 packet.
Figure 3B:
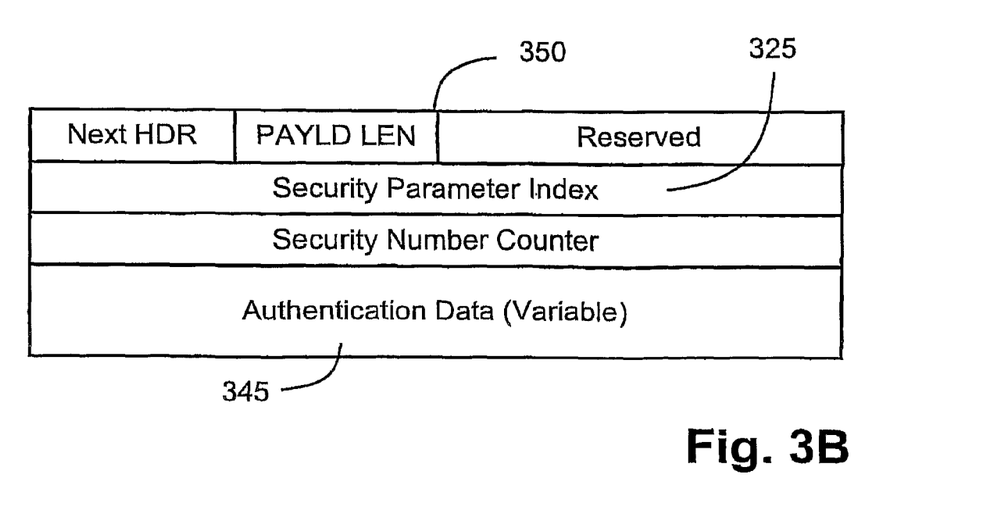
Figure 3C:
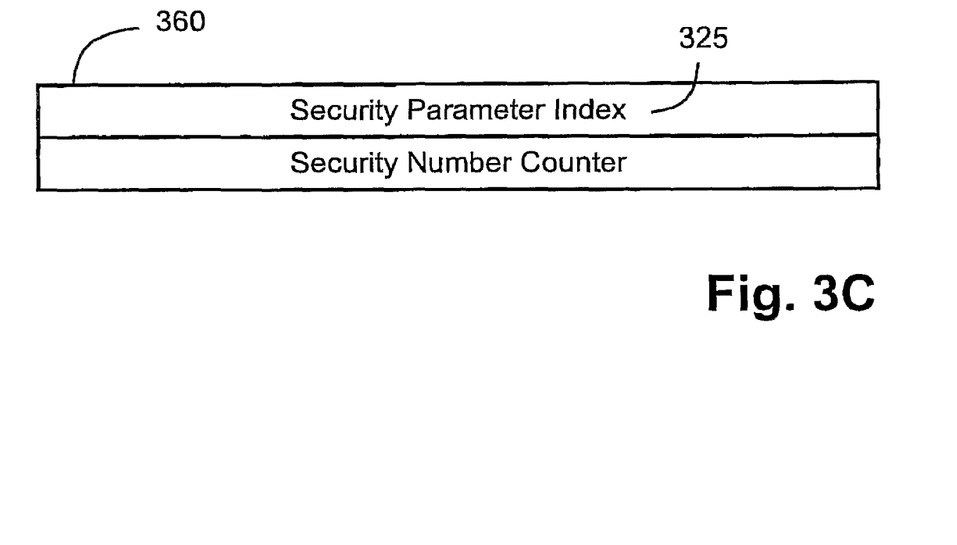
Figure 3D:
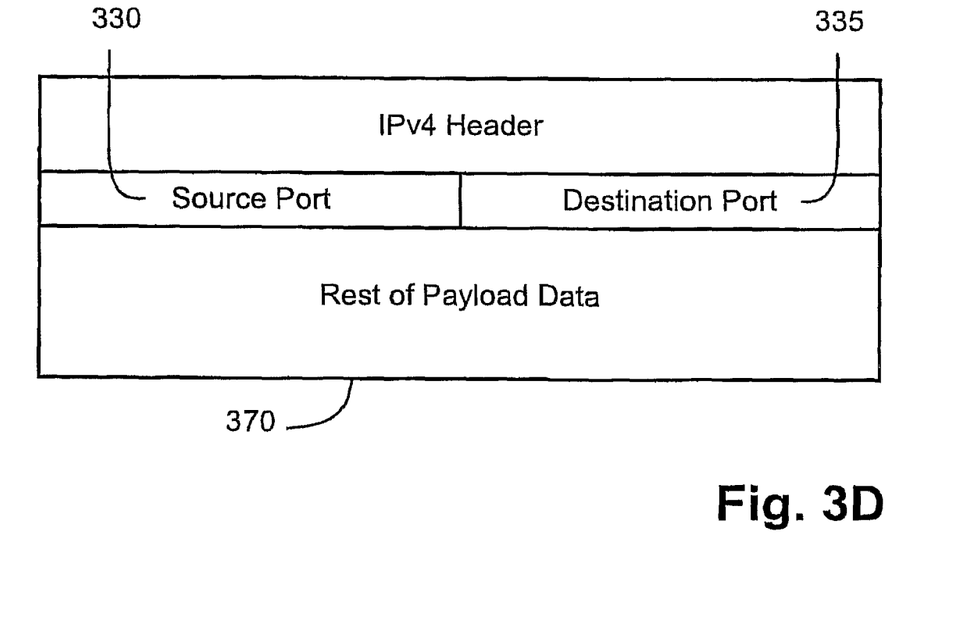

The aforementioned selectors for the Security Association lookup differ for a received packet and a packet for transmission. In the case of a packet for transmission, the selectors consist of the Source IP address 310, the Destination IP address 315, the Protocol 305, the Source Port 330 and the Destination Port 335. For a received packet the selectors consist of the Source IP address 310, the Destination IP address 315 and the Security Parameter Index (SPI) 325.

Returning to FIG. 2A the Packet Loader 100 continually tests in a step 530 whether the incoming packet is complete. If not, the process 500 is directed by a NO arrow to a step 540 which continues buffering the packet, and control returns via an arrow 511 to the step 520. If on the other hand buffering is determined by the step 530 to be complete, then the process 500 is directed by a YES arrow to a FINISH step 550.

FIG. 2B shows the process fragment 500' which runs concurrently with the process fragment 500 in FIG. 2A. The process fragment 500' commences from the circled letter "A" from FIG. 2A. As the data arrives at the Packet Loader 100 it is scanned in a step 555 by the Selector Finder 110, which continually tests in a step 560 whether the required selectors are available. While the required selectors are not available, i.e. while the selectors are not present in that portion of the incoming packet that has been received, then the process fragment 500' is directed by a NO arrow back to the step 555. Once the required selectors are available, the process fragment 500' is directed by a YES arrow to a step 565.

In the step 565 the Selector Finder 110 is able to obtain the selectors, either from the IP header 300 and the IP payload 400, or from the IP header 300 and the IPsec header 410 and the following payload 420 if required. A following step 570 transmits the selectors sequentially over a bus 120 to a device which provides an interface 130 to the Security Association Database (SAD) 145 via a bus 140. The SAD is controlled by an SAD management unit (not shown) which performs the actual SAD lookup using selectors sent by the SAD lookup interface 130. The Selector Finder 110 is informed, by a message processor (not shown) in the IPsec system 102, of whether the packet is a packet for transmission, or alternatively, is a received packet, and then further determines which selectors are required and also which selectors are available so the correct selectors can be obtained from the incoming packet and provided for an SAD search 145.

The selectors, which are described above, are used to perform an SAD lookup in a step 575 at the SAD management unit via the interface 130 and the bus 140. As the selectors are received in the IPsec system 102 at the start of the incoming packet 105, the SAD lookup can occur while the incoming packet is still being written to the packet RAM 180.

To perform a lookup, the SAD lookup interface 130 must first gain access to the arbitrated SAD request bus 140. Once access is granted, the interface 130 can transmit the selectors over the bus 140 in set transactions, and await the result of the SAD lookup. The composition of these set transactions vary depending on whether the incoming packet is a received packet or a packet for transmission, and the set transactions contain the selectors and any other information required for the SAD lookup.

The result of the SAD lookup by the SAD management unit 145 contains the data stored within the Security Association (SA) entry matched by the selectors. This information is transmitted in pre-defined data structures from the SAD management unit 145 to the SAD lookup interface 130. The SAD lookup interface 130 streams the received data structures in a step 580 to the cryptographic algorithmic unit 170 and to the IPsec processing modules 160 over a bus 150.

The cryptographic algorithmic unit 170 uses the transmitted data to configure itself, in a step 585, with the algorithms to be used, the cryptographic keys to be used, and the mode in which the selected algorithms are to run. The data that is used to configure the cryptographic algorithms within the cryptographic algorithmic unit 170 is obtained from the data structures transmitted on the bus 150 from the SAD lookup interface 130.

The IPsec processing units 160, which typically include an ESP unit 155 and an AH unit, configure themselves, in a step 590, with the IPsec protocol specific information and algorithmic information. This information includes whether the SA is in transport or tunnel mode, the length of the Authentication Data 345, which IPsec processing unit 160 should process the incoming packet (eg, ESP or AH) and the block size of the algorithms. The data that is used to configure the IPsec processing units 160 is obtained from the data structures transmitted on the bus 150 from the SAD lookup interface 130.

The IPsec processing units 160 can now start processing, in a step 595, the IPsec header and the buffered section of the incoming packet obtained from memory 180 via the link 185. All data to be processed by the cryptographic algorithmic unit 170 can now be passed to the cryptographic algorithmic unit 170 via the link 165 by the IPsec processing units 160. The resultant data from the cryptographic and IPsec processing can be written back, in a step 598, to memory 180 via the link 185.

FIGS. 5A-5D show, having regard to the packet RAM 180 in FIG. 1B, at various stages during the arrival of an incoming packet according to the disclosed partial packet IPsec processing arrangement, a memory segment 200 that has been allocated for the entire incoming packet being considered, the memory 210 that has been taken up by that proportion 210 of the incoming packet that has been received to the point of time in question, and the memory 220 to which data processed from that section 210 has been written.

Figure 5A:
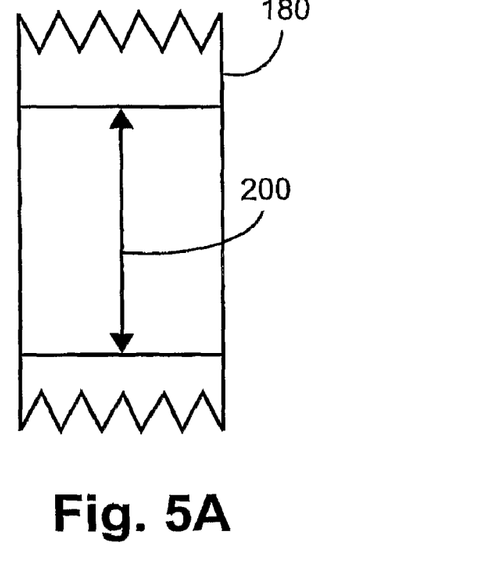
FIGS. 5A-5D depict memory utilisation during operation of the partial packet IPsec processing method.
Figure 5B:
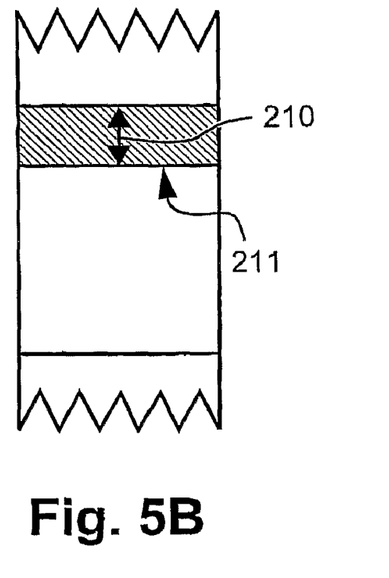
Figure 5C:
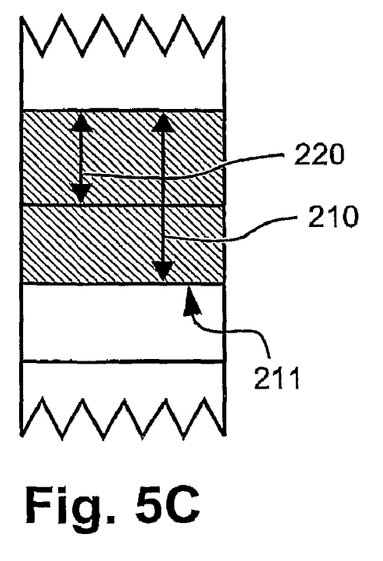
Figure 5D:
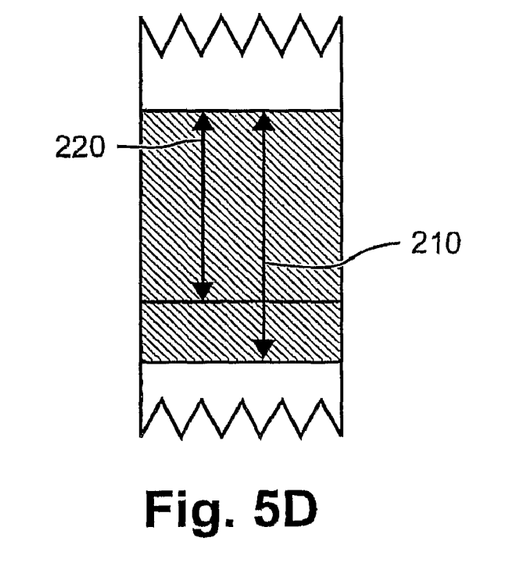

The IPsec processing units 160 make sure that the memory consumed by the processed section 220 of the incoming packet does not pass the leading edge 211 of the arrived section of the incoming packet 210. The IPsec processing units 160 ensure that this does not occur during step 595 by monitoring the aforementioned status information on the bus 190 from the Packet Loader 100. The aforementioned information includes whether the whole incoming packet has arrived and the current write pointer of the incoming packet in memory. The whole incoming packet has arrived and can be fully processed, as shown in FIG. 5D, when the arrived section of the incoming packet 210 is equal to size of the allocated memory 200 or conforms to the packet total length 320 contained in the IP header 300. As the incoming packet arrives and is processed, as shown in FIGS. 5A-5D, the arrived section 210 must always be greater than the processed section 220.

Figure 6:
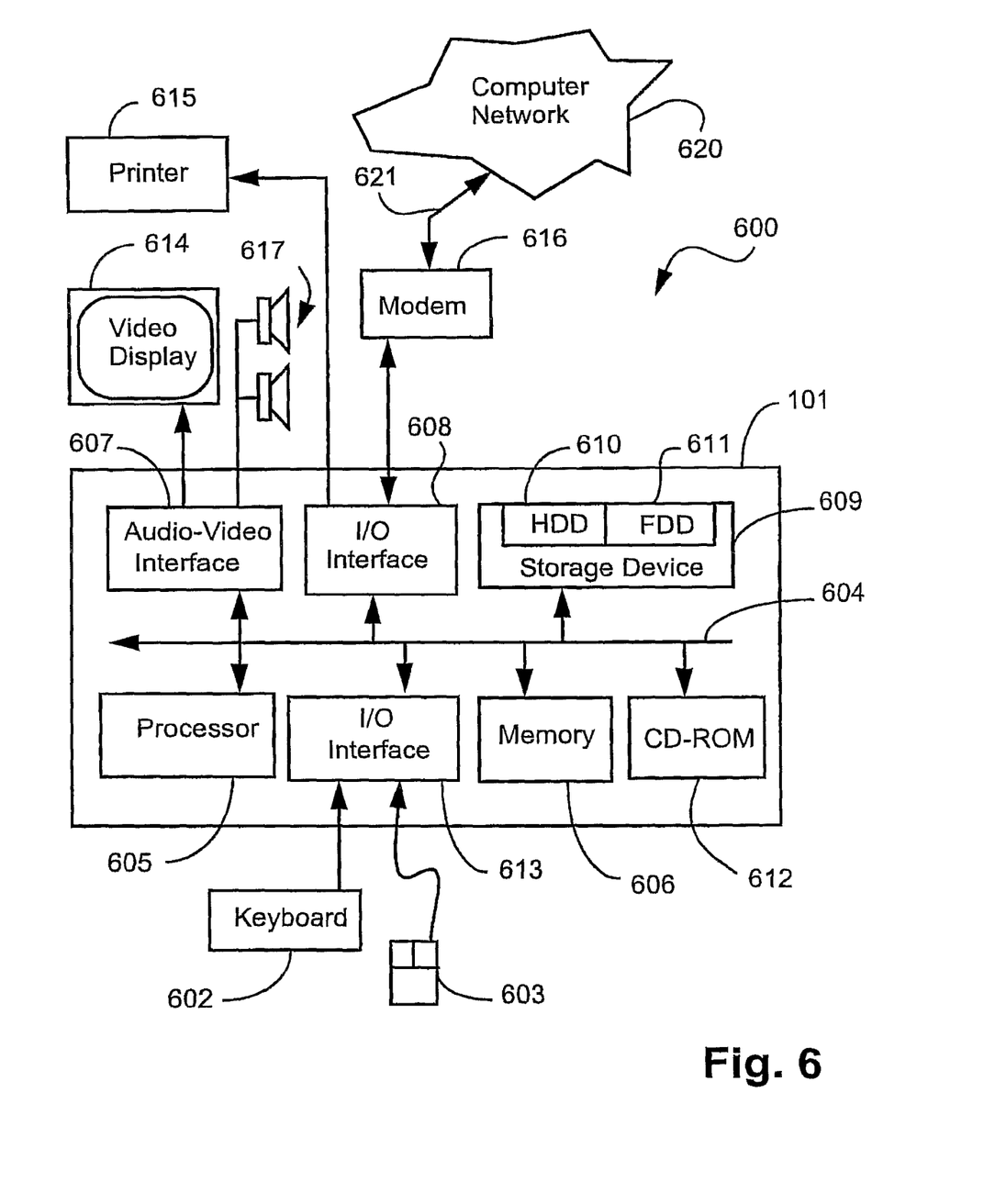
FIG. 6 is a schematic block diagram of a general purpose computer upon which a software implementation of the partial packet IPsec processing approach arrangement described can be practised.

FIG. 6 shows how the method of partial packet IPsec processing can be practiced using a general-purpose computer system 600, such as that shown in FIG. 6 wherein the processes of FIGS. 2A-2B may be implemented as software, such as an application program executing within the computer system 600. In this arrangement the IPsec system 102 of FIGS. 1A and 1B are implemented, as one or more software applications, in the host machine 101.

In this arrangement, the steps of method of partial packet IPsec processing are effected by instructions in the software that are carried out by the computer. The instructions may be formed as one or more code modules, each for performing one or more particular tasks. The software may also be divided into two separate parts, in which a first part performs the partial packet IPsec processing methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for partial packet IPsec processing.

The computer system 600 is formed by the host computer module 101, input devices such as a keyboard 602 and mouse 603, output devices including a printer 615, a display device 614 and loudspeakers 617. A Modulator-Demodulator (Modem) transceiver device 616 is used by the computer module 101 for communicating to and from a communications network 620, for example connectable via a telephone line 621 or other functional medium. The modem 616 can be used to obtain access to the Internet, and other network systems, such as a Local Area Network (LAN) or a Wide Area Network (WAN), and may be incorporated into the computer module 101 in some implementations.

The computer module 101 typically includes at least one processor unit 605, and a memory unit 606, for example formed from semiconductor random access memory (RAM) and read only memory (ROM). The module 101 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the modem 616 and printer 615. In some implementations, the modem 616 may be incorporated within the computer module 101, for example within the interface 608. A storage device 609 is provided and typically includes a hard disk drive 610 and a floppy disk drive 611. A magnetic tape drive (not illustrated) may also be used. A CD-ROM drive 612 is typically provided as a non-volatile source of data. The components 605 to 613 of the computer module 101, typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations or alike computer systems evolved therefrom.

Typically, the application program is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611, or alternatively may be read by the user from the network 620 via the modem device 616. Still further, the software can also be loaded into the computer system 600 from other computer readable media. The term "computer readable medium" as used herein refers to any storage or transmission medium that participates in providing instructions and/or data to the computer system 600 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infrared transmission channels as well as a network connection to another computer or networked device, and the Internet or Intranets including e-mail transmissions and information recorded on Websites and the like.

The method of partial packet IPsec processing is preferably implemented in dedicated hardware such as one or more integrated circuits performing the functions or sub functions of partial packet IPsec processing. Such dedicated hardware may include graphic processors, digital signal processors, or one or more microprocessors and associated memories.

Figure 7:
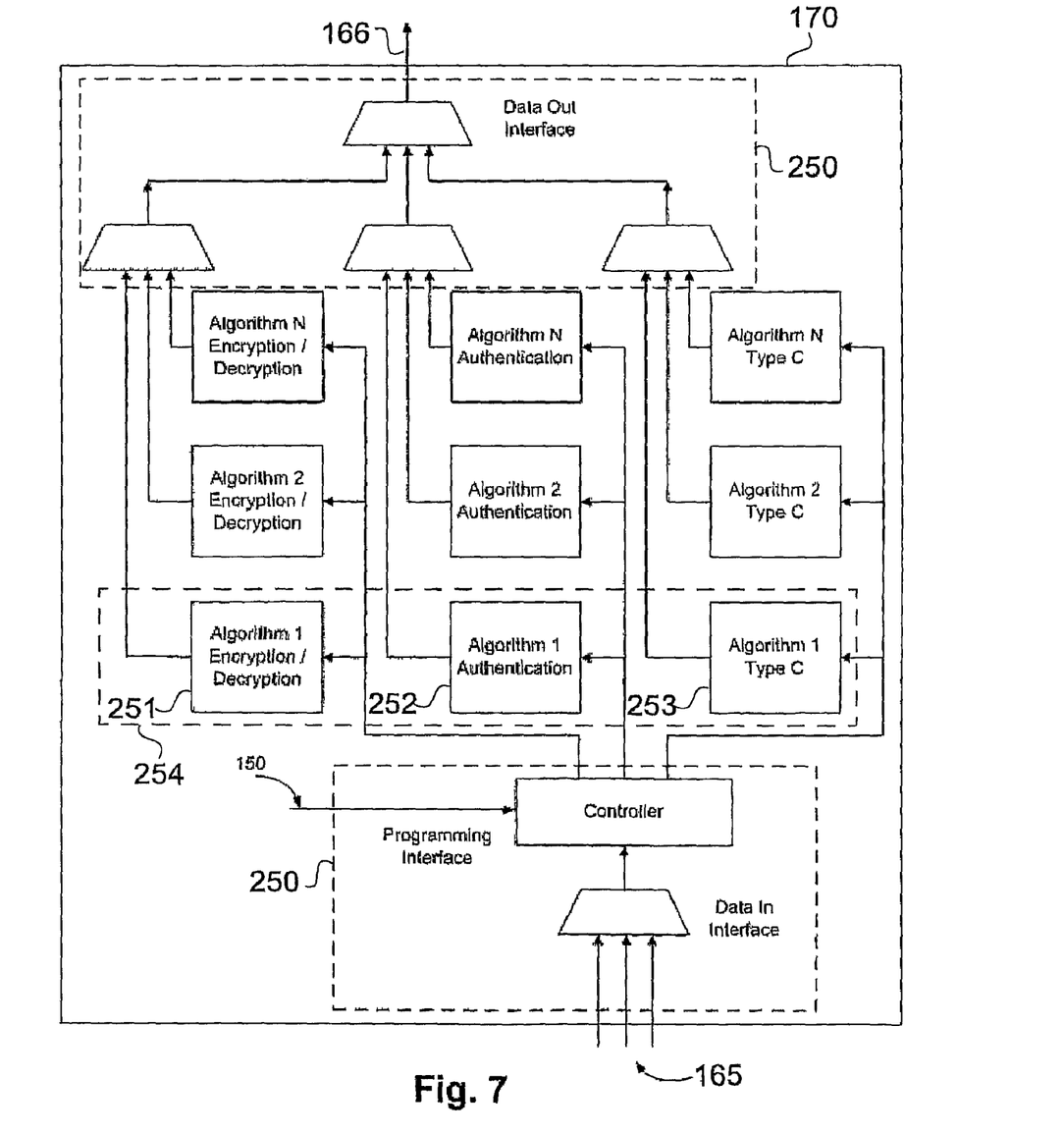
FIG. 7 depicts the cryptographic algorithmic unit of FIG. 1B in more detail.

FIG. 7 depicts the cryptographic algorithmic unit 170 of FIG. 1B in more detail. The cryptographic algorithmic unit 170 comprises a controller 250, shown in two parts, each of which is surrounded by a dashed box, and supports N sets of algorithms. Each algorithm set (numbered 1 to N in FIG. 7) comprises several modules, each module implementing a mode of operation of the algorithm. Illustrative modes are represented in FIG. 7 as encryption/decryption, authentication, and a generic mode labelled as "Type C". Thus, for example, a first algorithm set 254 comprises an encryption/decryption module 251, an authentication module 252, and a generic Type C module 253.

During the configuration step 585 (see FIG. 2B), the cryptographic algorithmic unit controller 250 receives the transmitted configuration data via the connection 150 and sets up the associated data paths within the cryptographic algorithmic unit 170. The cryptographic algorithmic unit controller 250 then sends the cryptographic keys to the selected algorithm modules and sets the selected algorithm modules to the correct mode.

Once the cryptographic algorithmic unit 170 has been configured and the data path has been set, the cryptographic algorithmic unit controller 250 controls the data flow of data from the protocol processing units 160 (see FIG. 1B) via the input path 165 to the appropriate algorithm module and thence back to the protocol processing units 160 via the output path 166.

INDUSTRIAL APPLICABILITY

It is apparent from the above that the arrangements described are applicable to the data processing industry.

The foregoing describes only some embodiments of the present invention, and modifications and/or changes can be made thereto without departing from the scope and spirit of the invention, the embodiments being illustrative and not restrictive.

What is claimed is:

1. A method of performing IPsec processing of a packet, the method comprising:
    a first determining step of determining, from a received portion of the packet, if required information has been received to enable said IPsec processing to be commenced;
    a first obtaining step of obtaining, based upon said required information, data from a Security Association Database (SAD) based on the received portion of the packet, before the entire packet has been received, the data obtained in a pre-defined data structure;
    a second determining step of determining if the received portion of the packet is equal to a size of an allocated memory;
    a first configuring step of configuring a cryptographic algorithmic unit based on the obtained data, said cryptographic algorithmic unit comprising a plurality of modules, said first configuring step comprising:
        i) a selecting step of selecting at least one of the plurality of modules based on the obtained data to set a data path within the cryptographic algorithmic unit;
        ii) a first receiving step of receiving at least one cryptographic key from a cryptographic algorithmic unit controller to set the selected module to a correct mode; and
        iii) a second receiving step of receiving the received portion of the packet for IPsec processing;
    a second configuring step of configuring an IPsec processing unit for IPsec processing of said packet depending upon the obtained data, and upon the at least one cryptographic key received from the cryptographic algorithmic unit controller before the entire packet has been received, if the received portion of the packet is equal to the size of the allocated memory; and
    a commencing step of commencing, before the entire packet has been received, IPsec processing of said packet in the configured IPsec processing unit based on the obtained data, wherein said IPsec processing comprises executing at least one of the following functions:
        (a) Encapsulating Protocol (ESP);
        (b) Authentication Header (AH);
        (c) IP Compression (IPcomp); and
        (d) Internet Key Exchange (IKE).

2. A method according to claim 1, wherein: said required information comprises required selectors to support a search of the Security Association Database;

prior to the first obtaining step the method comprises a further step of obtaining said required information comprising said required selectors from the received portion of the packet; and the IPsec processing step comprises the steps of:

extracting, depending upon said selectors, a Security Association from corresponding Security Association entries in said Security Association Database; and processing said packet depending upon the extracted Security Association.

3. A method according to claim 2 comprising, after the further step of obtaining said selectors from the received portion of the packet and prior to the first determining step, a step of (a) performing a Security Policy Database lookup dependent upon said selectors in the packet or (b) determining presence of an IPsec header in the packet, to thereby determine if the packet is to be processed.

4. A method according to claim 1, wherein the first determining step is repeated for at least some successively received portions of the packet.

5. A method according to claim 1, wherein the IPsec processing is performed at a speed at least equal to the line speed at which the incoming packet is received.

6. A method according to claim 1, wherein: prior to the first determining step the method comprises the step of identifying that the packet is one of a transmit packet and a receive packet; and the first determining step is performed dependent upon the identifying step.

7. An apparatus for performing IPsec processing of a packet, the apparatus comprising:

first determining means for determining, from a received portion of the packet, if required information has been received to enable said IPsec processing to be commenced;

first obtaining means for obtaining, based upon said required information, data from a Security Association Database (SAD) based on the received portion of the packet before the entire packet has been received, the data obtained in a pre-defined data structure;

second determining means for determining if the received portion of the packet is equal to a size of an allocated memory;

first configuring means for configuring a cryptographic algorithmic unit based on the obtained data, said cryptographic algorithmic unit comprising a plurality of modules, said first configuring means comprising:

i) selecting means for selecting at least one of the plurality of modules based on the obtained data to set a data path within the cryptographic algorithmic unit;

ii) first receiving means for receiving at least one cryptographic key from a cryptographic algorithmic unit controller to set the selected module to a correct mode; and iii) second receiving means for receiving the received portion of the packet for IPsec processing;

second configuring means for configuring an IPsec processing unit for IPsec processing of said packet depending upon the obtained data, and upon the at least one cryptographic key received from the cryptographic algorithmic unit controller before the entire packet has been received, if the received portion of the packet is equal to the size of the allocated memory;

processing means for commencing, before the entire packet has been received, IPsec processing of said packet in the configured IPsec processing unit based on the obtained data, wherein said IPsec processing comprises executing at least one of the following functions:

(a) Encapsulating Protocol (ESP);
(b) Authentication Header (AH);
(c) IP Compression (IPcomp); and
(d) Internet Key Exchange (IKE).

8. An apparatus for performing IPsec processing of a packet, the apparatus comprising:

a processor; and a memory storing a program for directing the processor to perform the steps of:

a first determining step of determining, from a received portion of the packet, if required information has been received to enable said IPsec processing to be commenced;

a first obtaining step of obtaining, based upon said required information, data from a Security Association Database (SAD) based on the received portion of the packet before the entire packet has been received, the data obtained in a pre-defined data structure;

a second determining step of determining if the received portion of the packet is equal to a size of an allocated memory;

a first configuring step of configuring a cryptographic algorithmic unit based on the obtained data, said cryptographic algorithmic unit comprising a plurality of modules, said first configuring step comprising:

i) a selecting step of selecting at least one of the plurality of modules based on the obtained data to set a data path within the cryptographic algorithmic unit;

ii) a first receiving step of receiving at least one cryptographic key from a cryptographic algorithmic unit controller to set the selected module to a correct mode; and iii) a second receiving step of receiving the received portion of the packet for IPsec processing;

a second configuring step of configuring an IPsec processing unit for IPsec processing of said packet depending upon the obtained data, and upon the at least one cryptographic key received from the cryptographic algorithmic unit controller before the entire packet has been received, if the received portion of the packet is equal to the size of the allocated memory;

a commencing step of commencing, before the entire packet has been received, IPsec processing of said packet in the configured IPsec processing unit based on the obtained data, wherein said IPsec processing comprises executing at least one of the following functions:

(a) Encapsulating Protocol (ESP);
(b) Authentication Header (AH);
(c) IP Compression (IPcomp); and
(d) Internet Key Exchange (IKE).

9. A computer readable storage device having recorded thereon a computer program for directing a processor to execute a method of performing IPsec processing of a packet, the program comprising code for performing the steps of:

a first determining step of determining, from a received portion of the packet, if required information has been received to enable said IPsec processing to be commenced;

a first obtaining step of obtaining, based upon said required information, data from a Security Association Database (SAD) based on the received portion of the packet before the entire packet has been received, the data obtained in a pre-defined data structure;

a second determining step of determining if the received portion of the packet is equal to a size of an allocated memory;

a first configuring step of configuring a cryptographic algorithmic unit based on the obtained data, said cryptographic algorithmic unit comprising a plurality of modules, said first configuring step comprising:
  i) a selecting step of selecting at least one of the plurality of modules based on the obtained data to set a data path within the cryptographic algorithmic unit;
  ii) a first receiving step of receiving at least one cryptographic key from a cryptographic algorithmic unit controller to set the selected module to a correct mode; and
  iii) a second receiving step of receiving the received portion of the packet for IPsec processing;
a second configuring step of configuring an IPsec processing unit for IPsec processing of said packet depending upon the obtained data, and upon the at least one cryptographic key received from the cryptographic algorithmic unit controller before the entire packet has been received, if the received portion of the packet is equal to the size of the allocated memory;
a commencing step of commencing, before the entire packet has been received, IPsec processing of said packet in the configured IPsec processing unit based on the obtained data, wherein said IPsec processing comprises code for executing at least one of the following functions:
  (a) Encapsulating Protocol (ESP);
  (b) Authentication Header (AH);
  (c) IP Compression (IPcomp); and
  (d) Internet Key Exchange (IKE).

10. A method of performing IPsec processing of a packet, the method comprising the steps of:

determining, from a received portion of the packet, if required information has been received to enable said IPsec processing to be commenced;

obtaining, based upon said required information, data from a Security Association Database (SAD) based on the received portion of the packet before the entire packet has been received, the data obtained in a pre-defined data structure;

determining if the received portion of the packet is equal to a size of an allocated memory;

configuring a cryptographic algorithmic unit based on the obtained data, said cryptographic algorithmic unit comprising a plurality of modules, said configuring step comprising:
  i) selecting at least one of the plurality of modules based on the obtained data to set a data path within the cryptographic algorithmic unit;
  ii) receiving at least one cryptographic key from a cryptographic algorithmic unit controller to set the selected module to a correct mode; and
  iii) receiving the received portion of the packet for IPsec processing;

configuring an IPsec processing unit for IPsec processing of said packet depending upon the obtained data, and upon the at least one cryptographic key received from the cryptographic algorithmic unit controller before the entire packet has been received, if the received portion of the packet is equal to the size of the allocated memory, before the entire packet has been received; and commencing, before the entire packet has been received, IPsec processing of said packet in the configured IPsec processing unit based on the obtained data.

* * * * *